F. MÜLLER.
DIRIGIBLE HEADLIGHT.
APPLICATION FILED AUG. 14, 1912.
1,060,205.
Patented Apr. 29, 1913.
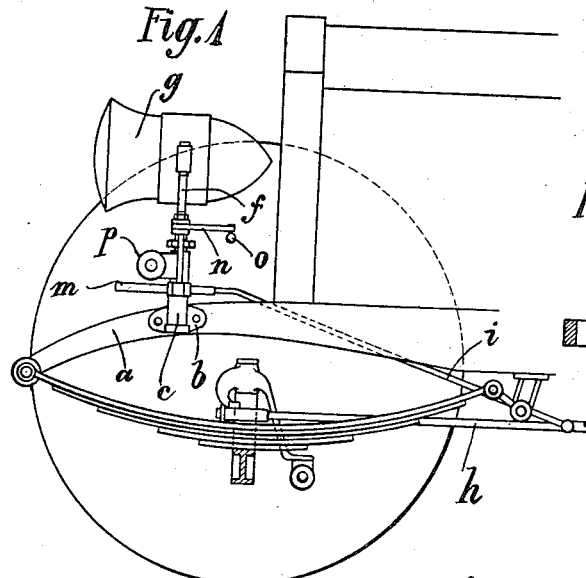
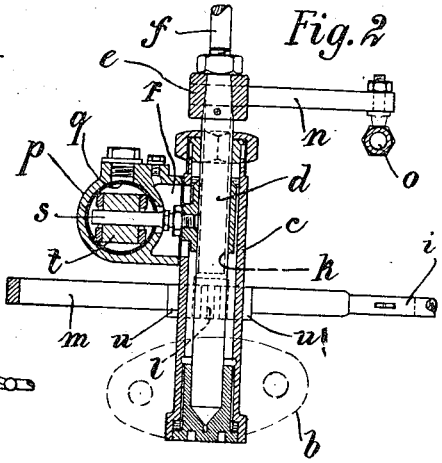
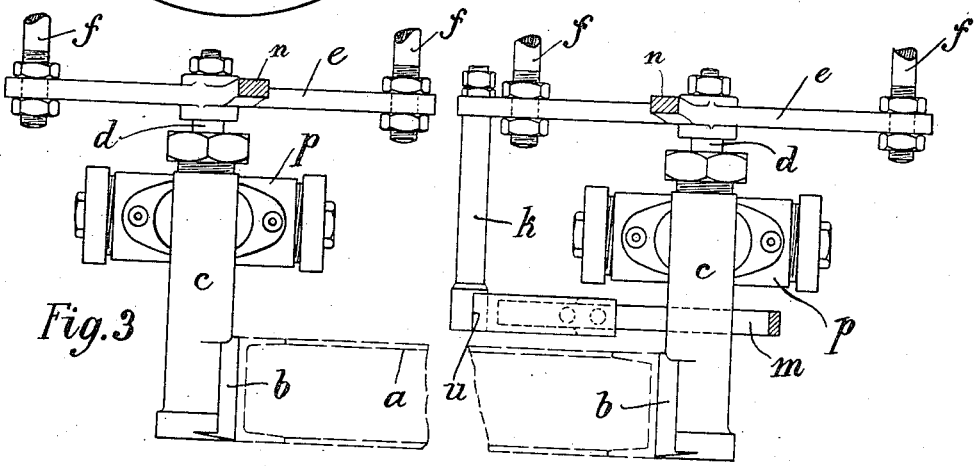
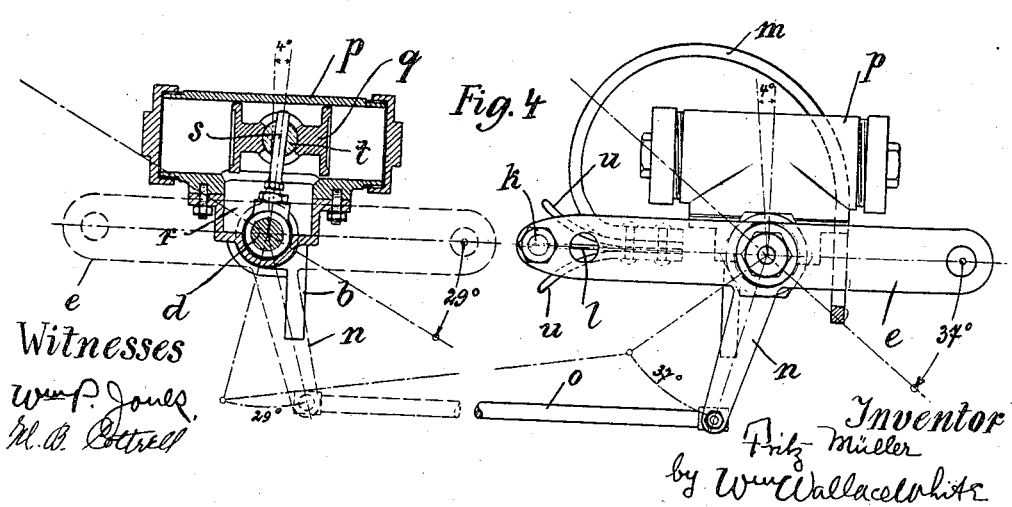

UNITED STATES PATENT OFFICE.

FRITZ MÜLLER, OF COLOGNE-SÜLZ, GERMANY.

DIRIGIBLE HEADLIGHT.

1,060,205.

Specification of Letters Patent. Patented Apr. 29, 1913.

Application filed August 14, 1912. Serial No. 714,965.

*To all whom it may concern:*

Be it known that I, FRITZ MÜLLER, a subject of the German Emperor, residing at Cologne-Sülz, Germany, have invented new and useful Improvements in Dirigible Headlights, of which the following is a specification.

The inventor, by his Letters Patent No. 1,042,137, granted Oct. 22, 1912, has already received protection for apparatus for adjusting the lamps on motor-vehicles to the prevailing direction of travel whereby the lamps were positively connected with a fluid-pressure braking device through the medium of a spring member. The braking device is so constructed that, with respect to short and rapid movements of the parts which effect the adjustment of the lamps, its resistance is greater than the resistance of the spring member, so that the lamps are unable to partake in the lateral vibrating movements of steering wheels.

According to the previous arrangement the fluid-pressure braking device consisted essentially of a casing filled with a fluid adapted to act as the braking medium and provided within with a wheel having vanes each of which was furnished with a small hole.

The present invention relates mainly to a peculiar mode of constructing the fluid-pressure braking device whereby at the same time the arrangement as a whole is further developed and perfected.

The new arrangement is illustrated in Figures 1–4 of the accompanying drawings, Fig. 1 showing the whole arrangement as seen from the side of the vehicle. Fig. 2 is a vertical sectional view through the lamp carrying casing. Fig. 3 is a rear elevational view, parts being shown in section. Fig. 4 is a plan view, parts being shown in section for the sake of clearness.

Referring to the drawings there is secured on each side of the motor vehicle to the frame $a$ thereof by means of a flange $b$ a casing $c$ in which the vertical lamp carrier $d$ is mounted so as to be capable of rotating horizontally. The said carrier supports at its upper end, which projects above the casing $c$, a narrow plate or bar $e$ upon which is mounted the lamp $g$ (Fig. 1) by means of supports $f$ which extend fork-like upward and incline inward toward each other. The bars $e$ of the two lamp carriers are each provided, moreover, with a lever-like extension $n$ and these two levers $n$ are pivotally connected with one another by a rod $o$ (Fig. 4). In order that the two lamps of the vehicle may be controlled simultaneously with the steering wheels, there is linked up to the main control rod $h$ of the steering wheels (Fig. 1) an auxiliary control rod $i$ which engages through a spring member with the bar $e$ on one, for instance the right-hand, lamp carrier. In the form of construction shown the spring member consists of a straight plate spring $l$ (Fig. 4) secured to the pin $k$ on the right-hand bar $e$ and having riveted to its free end a semi-circular plate spring $m$. Thus as the steering wheels are controlled both lamps are correspondingly turned and adjusted to the prevailing direction of travel owing to the simultaneous movement of the auxiliary control rod $i$ transmitted through the spring member $m$, $l$. A fluid-pressure braking device is, however, positively connected with each lamp carrier. The said braking device consists of a cylinder $p$ filled with a fluid adapted to act as the braking medium and provided with a piston $q$ having a slack fit. The vertical lamp carrier $d$ extends toward its upper end through a lateral chamber $r$ of the braking device and carries a horizontal pin $s$, the free end of which passes through the bore of a bush $t$ rotatably mounted in the piston. During the short and rapid vibrating movements of the steering wheels the resistance of the fluid-pressure braking device, which as is well understood increases as the square of the velocity, is greater than the resistance of the spring member. The piston $q$, of the fluid-pressure braking device remains therefore under such conditions immovable so that the lamps cannot partake of the vibrating movements of the steering wheels. On the other hand, during the comparatively slow movement of the controlling parts when steering, the resistance of the fluid-pressure braking device is less than that of the spring member, so that, under these conditions, the piston $q$ is moved to the one or to the other side in the cylinder $p$ by the pin $s$ and the braking fluid flows from one side of the cylinder to the other past the piston owing to the slack fit. During the to-and-fro movement of the piston the pin $s$ slides in the bush $t$ which is simultaneously slightly rotated.

As may be seen in Fig. 4, the levers $n$, $o$, $n$, which connect the two lamp carriers form a linked trapezoid, the side levers *n, n* of which incline inwardly, that is to say, toward each other. In this manner a somewhat accelerated movement of the left-hand lamp is attained when steering by the left and of the right-hand lamp when steering by the right, so that a curve about to be traversed becomes brightly lighted from the very commencement of the steering movement. As an example, steering by the right is illustrated in Fig. 4 where the right hand lever makes an angular movement of 37° while the left-hand lever passes through 29° only so that the right-hand lamp has therefore an accelerated movement. Further, the pins *s* on the lamp carriers which engage with the pistons *q* are also both inwardly inclined, as shown for example in Fig. 4, by 4° each. By this means the piston which happens to have an accelerated movement, as for example, the right-hand piston in Fig. 4, is provided with a somewhat longer path to travel before reaching the end of its stroke than that provided for the slower moving piston which would be the left-hand piston in Fig. 4. Both pistons will therefore come into contact with the cylinder cover at the same moment.

In order to limit the movement of the plate spring *l* two correspondingly bent stops *u* are provided on the spring adapted to engage with the pin *k* when the spring is bent by the movement of the control rod.

What I claim and desire to secure by Letters Patent, is:—

1. In a motor vehicle, in combination, a steering gear, a lamp, a connection comprising a spring member between said steering gear and said lamp, a cylinder containing a fluid, and a piston loosely fitted therein and operatively connected to said lamp.

2. In a motor vehicle, in combination, a steering gear, a lamp, a connection comprising a spring member between said steering gear and said lamp, a cylinder containing a fluid, a piston loosely fitted therein and a pin operatively connected to said lamp and pivotally engaging said piston.

3. In a motor vehicle, in combination, a steering gear, a lamp, a connection comprising a spring member between said steering gear and said lamp, a cylinder containing a fluid, a piston loosely fitted therein, a bushing rotatably mounted in said piston and a pin operatively connected to said lamp and engaging said bushing.

4. In a motor vehicle, in combination, a steering gear, a pair of lamp supports, a connection comprising a spring member, between said steering gear and one of said supports, a pair of cylinders containing fluid and pistons loosely fitted in said cylinders, there being one cylinder and piston associated with each support, each provided with a pin pivotally engaging its associated piston, said pins converging toward one another.

5. In a motor vehicle, in combination, a steering gear, a lamp support, a plate spring having one end secured to the said support, a bent spring having one end secured to the free end of said plate spring and a connection between said bent spring and said steering gear.

In testimony whereof I have signed my name to this specification in the presence of two subscribing witnesses.

FRITZ MÜLLER.

Witnesses:
  LOUIS VANDORY,
  J. THRANBEREND.

---

Copies of this patent may be obtained for five cents each, by addressing the "Commissioner of Patents, Washington, D. C."